(12) United States Patent
Kröner

(10) Patent No.: US 9,409,332 B2
(45) Date of Patent: Aug. 9, 2016

(54) METHOD FOR PRODUCING SUPPORT STRUCTURES IN MOTOR VEHICLES

(75) Inventor: Gregor Kröner, Bischberg (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 424 days.

(21) Appl. No.: 13/395,428

(22) PCT Filed: Sep. 7, 2010

(86) PCT No.: PCT/DE2010/001057
§ 371 (c)(1),
(2), (4) Date: May 9, 2012

(87) PCT Pub. No.: WO2011/029430
PCT Pub. Date: Mar. 17, 2011

(65) Prior Publication Data
US 2012/0241999 A1    Sep. 27, 2012

(30) Foreign Application Priority Data
Sep. 11, 2009 (DE) .................. 10 2009 040 901

(51) Int. Cl.
*B29C 45/14* (2006.01)
*B29C 70/46* (2006.01)
(Continued)

(52) U.S. Cl.
CPC ....... *B29C 45/14786* (2013.01); *B29C 45/1418* (2013.01); *B29C 70/46* (2013.01);
(Continued)

(58) Field of Classification Search
CPC ........ B29C 45/14; B29C 70/46; B29C 45/16; B29C 63/025; B29C 66/436; B29C 63/00; B60N 2/02; B60N 2/50; B60N 2/58; B60N 2/68; B60N 2/72; B60N 2205/00

USPC .................................................. 264/257, 255
See application file for complete search history.

(56) References Cited

U.S. PATENT DOCUMENTS 3,353,869 A * 11/1967 Getz et al. ................. 297/452.49
4,368,917 A *  1/1983 Urai .......................... A47C 7/16
                                                    297/452.15
(Continued)

FOREIGN PATENT DOCUMENTS

DE     199 07 439 C2    8/2000
DE     101 43 564 A1    3/2003
(Continued)

OTHER PUBLICATIONS

English translation of the International Preliminary Report on Patentability for international application No. PCT/DE2010/001057, dated Mar. 13, 2012, 7 sheets.
(Continued)

*Primary Examiner* — Alison L Hindenlang
*Assistant Examiner* — Jerzi H Moreno Hernandez
(74) *Attorney, Agent, or Firm* — Lewis Roca Rothgerber Christie LLP

(57) ABSTRACT

According to a method for producing support structures in motor vehicles, especially parts of a motor vehicle seat, at least one base element (BE) consisting of a thermoplastic material with a fabric back stay, especially a glass fiber reinforced thermoplastic (GMT) is inserted into tool (8) to form a support structure base (TB), is thermoplastically deformed and is subjected, at the same time or subsequently, to at least one additional process for reinforcing the support structure base (TB), integrally forming at least one additional structure (ZS), and integration of functional parts or integration of interfaces for additional components into the support structure (TB).

18 Claims, 4 Drawing Sheets

(51) Int. Cl.
*B29C 70/78* (2006.01)
*B60N 2/68* (2006.01)
*B29K 101/12* (2006.01)
*B29K 105/08* (2006.01)
*B29K 709/08* (2006.01)
*B29L 31/30* (2006.01)
*B29L 31/00* (2006.01)

(52) U.S. Cl.
CPC ........... *B29C 70/78* (2013.01); *B60N 2/68* (2013.01); *B29K 2101/12* (2013.01); *B29K 2105/0809* (2013.01); *B29K 2709/08* (2013.01); *B29L 2031/3055* (2013.01); *B29L 2031/771* (2013.01)

(56) References Cited

U.S. PATENT DOCUMENTS

| | | | | |
|---|---|---|---|---|
| 4,883,320 | A * | 11/1989 | Izumida | B60N 2/7094 297/284.1 |
| 5,044,694 | A * | 9/1991 | Koa | B60N 2/40 297/452.12 |
| 5,283,028 | A * | 2/1994 | Breezer et al. | 264/511 |
| 5,356,588 | A * | 10/1994 | Hara et al. | 264/257 |
| 5,564,144 | A * | 10/1996 | Weingartner et al. | 297/452.27 |
| 6,158,815 | A * | 12/2000 | Sugie | A47C 7/282 297/452.49 |
| 6,739,673 | B2 * | 5/2004 | Gupta et al. | 297/452.65 |
| 7,338,039 | B2 * | 3/2008 | Pfau et al. | 267/144 |
| 7,353,553 | B2 * | 4/2008 | Huse | A47C 27/16 297/452.53 |
| 7,399,036 | B2 * | 7/2008 | Kowal | A47C 4/02 297/440.16 |
| 2005/0168041 | A1 | 8/2005 | Glance et al. | |
| 2006/0152063 | A1 * | 7/2006 | Nagayama | B60N 2/1615 297/452.49 |
| 2008/0001464 | A1 * | 1/2008 | Mundell et al. | 297/452.52 |
| 2008/0030060 | A1 * | 2/2008 | Schwingenschlogel et al. | 297/354.12 |
| 2008/0290555 | A1 * | 11/2008 | Kim et al. | 264/257 |
| 2010/0032870 | A1 * | 2/2010 | Pfeiffer et al. | 264/319 |
| 2011/0044753 | A1 * | 2/2011 | Kotaki | B60N 2/7041 403/235 |

FOREIGN PATENT DOCUMENTS

| | | | | |
|---|---|---|---|---|
| DE | 20 2007 000 484 | | 6/2008 | |
| DE | 20 2007 000 484 | U1 | 6/2008 | |
| DE | 102008043196 | A1 * | 4/2010 | ....... B60N 2/02 |
| EP | 0 547 625 | A1 | 6/1996 | |
| EP | 0 730 947 | A2 | 9/1996 | |
| EP | 1593547 | A1 * | 11/2005 | ....... B60N 2/70 |
| EP | 2261075 | | * 12/2010 | |
| EP | 2 272 706 | A2 | 1/2011 | |
| WO | WO 2008/019981 | A1 | 2/2008 | |

OTHER PUBLICATIONS 1 page of Partial Translation of previously provided, (Burkle et al., "Verbundbauteile mit Mehrprozeβanlagen wirtschaftlich herstellen," Kunststoffe, vol. 81, No. 3, Mar. 1, 1991, pp. 192-198, Carl Hanser Verlag, Munchen, DE).

International Search Report, dated Mar. 8, 2011, corresponding to PCT/DE2010/001057, 7 pages.

Burkle et al., "Verbundbauteile mit Mehrprozeβanlagen wirtschaftlich herstellen," Kunststoffe, vol. 81, No. 3, Mar. 1, 1991, pp. 192-198, Carl Hanser Verlag, Munchen, DE.

* cited by examiner

METHOD FOR PRODUCING SUPPORT STRUCTURES IN MOTOR VEHICLES

This invention relates to a method for manufacturing support structures in motor vehicles, in particular parts of a motor vehicle seat and preferably a seat pan.

For shortening process times, for reducing the manufacturing effort and for weight minimization, metallic materials more and more are replaced by suitable plastics. In particular in manufacturing processes with high volumes in conjunction with the demand for a low weight of the products, as it is the case for example when manufacturing motor vehicle parts, the use of plastic materials leads to a considerable saving of costs and a shortening of cycle times in the manufacturing process.

The substitution of metallic materials by plastics frequently fails, however, due to the strength requirements which are placed on the products to be manufactured, in particular when the products are supporting structures. Moreover, although many plastics such as thermosetting plastics satisfy the strength requirements, they require too high cycle times for the curing process and therefore are not suitable for manufacturing high volumes.

Therefore, it is the object underlying the present invention to indicate a method which provides for manufacturing support structures in motor vehicles with high strength and durability with little material, time and manufacturing effort.

In accordance with the invention, this object is solved by a method with the features of claim 1.

The solution according to the invention provides a method for manufacturing support structures in motor vehicles which satisfy high strength and durability requirements with little material, time and manufacturing effort.

The use of fabric-reinforced thermoplastic materials, in particular of glass fiber mat thermoplastics or GMT is known in many technical fields, but their use in the automotive sector fails due to the specific strength and durability requirements which are placed on motor vehicle parts suitable for a material substitution, due to too high a manufacturing effort or too long a manufacturing period, which is required for manufacturing complex motor vehicle parts as a result of several consecutive processes.

Due to the combination of the forming process of a base element made of a fabric-reinforced thermoplastic material for shaping a support structure base with at least one additional process such as the injection molding of material accumulations for the strength-related reinforcement of parts of the support structure base, both strength and durability requirements and demands for little manufacturing effort and short cycle times are satisfied. At the same time, the combination of the forming process with an additional process for reinforcing the support structure base, for integrally molding at least one additional structure or for integrating functional parts or interfaces for additional components creates the prerequisite for taking account of the different load of support structures or parts of a support structure in terms of compressive or tensile stresses by selectively using base elements made of a fabric-reinforced thermoplastic material with a different type and form of fabric and by the selective local injection of material accumulations or by inserting reinforcing or stiffening elements.

The base element thermoplastically formed in a mold also can be subjected to the at least one additional process in the same mold or can subsequently be inserted into a further mold, for example into an injection mold, and be treated further.

In the additional process, plastic material is injected into the mold or into a mold accommodating the thermoplastically formed support structure base for the strength-related reinforcement of parts of the support structure base, or stiffening or reinforcing elements are inserted into the thermoplastically formed support structure base and overmolded with plastic material, wherein the stiffening or reinforcing elements are arranged in particular in those regions of the support structure base in which the support structure is exposed to increased compressive stresses.

For increasing the strength of a support structure, the base element can be made of a multi-layer fabric-reinforced thermoplastic material in whose spaces a gas generating cavities or hollow chambers is introduced during or after the forming process, in that for example an injection needle is moved into the workpiece holder of the mold and the gas is injected into the spaces of the multi-layer fabric-reinforced thermoplastic material.

The base element can consist of a large-surface plate of a fabric-reinforced thermoplastic material, whose surface is larger than the projected surface of the workpiece holder of the mold, or of a plurality of small-surface plates or strips of a fabric-reinforced thermoplastic material, whose surface is smaller than the projected surface of the workpiece holder of the mold, wherein the shape and size of the small-surface plates or strips of the base element can be dimensioned corresponding to the specific requirements of the support structure, the small-surface plates or strips can be provided with various types and forms of fabric in the composition of the fabric-reinforced thermoplastic material, and in regions of the support structure with corresponding stress direction of the load of the support structure equal forms or types of fabric can be used in the composition of the fabric-reinforced thermoplastic material (GMT) for the small-surface plates or strips.

The advantage of a large-surface plate consists in the simplified manufacture during the forming process, but what is disadvantageous here is a greater material waste, since the large-surface plate for the forming process must be greater than the surface of the workpiece holder of the mold projected into a plane, so that after the forming process edge trimming must be performed, in order to ensure the dimensional accuracy of the support structure.

Small-surface plates or strips of fabric-reinforced thermoplastic material require a slightly higher manufacturing effort by correspondingly inserting the small-surface plates or strips into the mold at the points provided for this purpose, which in particular are predetermined by strength requirements, but ensure an effective use of material, since they can be cut to size corresponding to the respective requirements placed on the support structure, so that subsequently no trimming is required. Due to the omission of trimming, the increased manufacturing effort on inserting the small-surface plates or strips into the mold can be more than compensated in many applications as compared to the use of large-surface plates, so that this variant for manufacturing the support structure base is advantageous in many applications.

Beside a corresponding tailoring of the small plates or strips of fabric-reinforced thermoplastic material corresponding to the respective requirements, a combination of various fabrics is possible, so that regions with uniform stress direction can specifically be reinforced, because fabric-reinforced materials have strongly anisotropic properties.

Preferably, the fabric of the fabric-reinforced thermoplastic material consists of a glass fiber fabric with a share in the base element of 40 to 70%.

As set forth above, the combination according to the invention of the forming process of a base element of a fabric-reinforced thermoplastic material with an additional process for reinforcing the support structure base provides for a strength-related reinforcement of parts of the support structure, so that the structure of the base element can be influenced, in that for example in regions of increased compressive stresses acting on the support structure a plastic material provided with short glass fibers or glass spheres is used for the strength-related reinforcement of parts of the support structure base or for overmolding stiffening or reinforcing elements.

By combining the forming process with a corresponding additional process in one mold it becomes possible to mold or injection-mold additional structures of a possibly fabric-reinforced plastic material to the support structure base, wherein either the additional structures are directly molded to the base element when forming the base element or are inserted into the mold after forming the base element and are injection-molded to the base element.

This method is particularly useful for molding or injection-molding components made of metal as additional structures to the base element by a simple and inexpensive method in a hybrid construction.

During the forming and additional process, holders, bearing points or interfaces of the support structure analogously can be molded to the base element during the forming process or be injection-molded to the support structure base after forming the base element.

In a preferred application of the method of the invention for manufacturing support structures in motor vehicles, the support structure consists of a seat pan of a motor vehicle whose structural strength in the region of tensile stresses occurring in the seat pan during usage is absorbed by the fabric-reinforced thermoplastic material of the base element, whereas in the region of compressive forces exerted on the seat pan during usage stiffening or reinforcing elements, in particular stiffening ribs, of reinforced plastic material are injection-molded to increase the rigidity.

This application optimally makes use of the combination of the forming process of a base element of a fabric-reinforced thermoplastic material with an additional process, in which at points provided for this purpose plastic material is injection-molded to the support structure base in the region of compressive stresses exerted on the support structure or ribs of reinforced plastic material are injection-molded to the support structure base to increase the rigidity.

In so-called "half-pans" for motor vehicle seats a spring mat must be mounted for supporting the cushion, which must be stretched between the seat pan and a further structural element, for example a rear transverse tube of the motor vehicle seat. Usually, the spring mat is made of a steel wire which subsequently is overmolded with plastic material, in order to eliminate noise and optimize the spring properties.

The solution according to the invention of combining the forming process of a base element of a fabric-reinforced thermoplastic material with an additional process inside a mold now, as an extension to the manufacture of a half-pan of fabric-reinforced thermoplastic material with possible selectively arranged reinforcements, provides for molding an additional structure formed as spring mat with flat or wave-like cross-section to the seat pan.

In this extended method, the spring mat in flat or wavy form is molded directly to the pan of fabric-reinforced thermoplastic material, wherein the glass fabric of the fabric-reinforced thermoplastic material used for the spring mat is resilient either due to its fabric structure or due to the shape of the spring mat, for example due to its wavy design.

The connection of the spring mat with flat or wave-like cross-section with the seat pan can be effected by integrally molding the spring mat to the seat pan in the forming process or after thermoplastically forming a base element for forming the seat pan by molding the additional structure formed as spring mat to the seat pan and possibly by additionally overmolding the molded portion with plastic material.

Alternatively, on thermoplastically forming a base element tabs can be molded to the seat pan, which in a molding process are placed around a spring mat made of metal with flat or wave-like cross-section, wherein the metallic spring mat and/ or the connection of the metallic spring mat with the seat pan is overmolded with plastic material.

Furthermore, additional fastening elements, such as hangings of the spring mat into a transverse tube of a motor vehicle seat, bearing points of the seat pan or spring mat or additional components made of plastics or metal can be injection-molded to the seat pan or to the spring mat.

With reference to several exemplary embodiments represented in the drawing, various variants of the method according to the invention for manufacturing support structures in motor vehicles and essential features of the solution according to the invention will now be explained. In the drawing.

Figure 1:
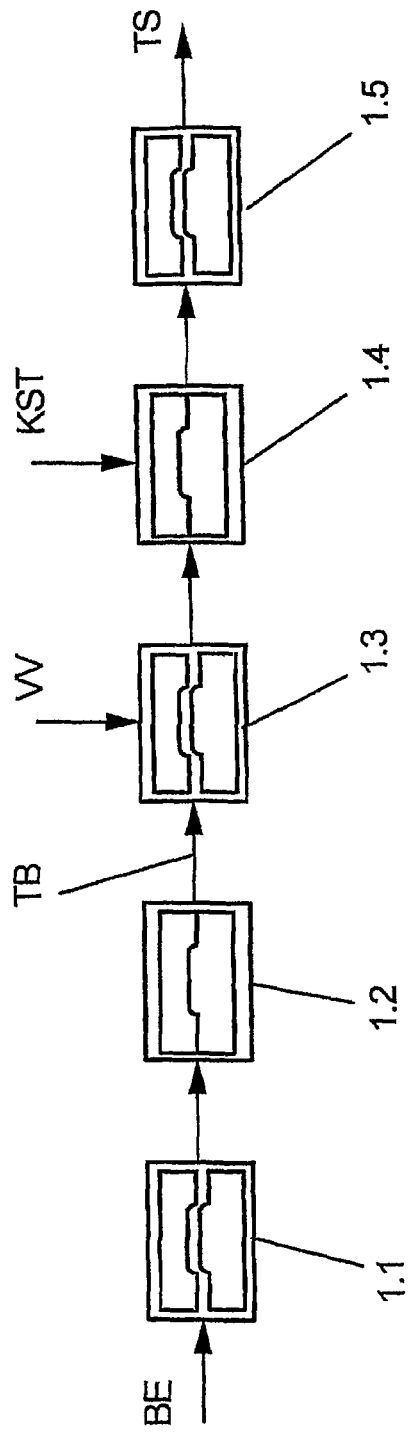
FIG. 1 shows a schematic block diagram of the combination of a forming process with the injection molding of reinforcing or stiffening elements to a support structure base inside a mold.
Figure 2:
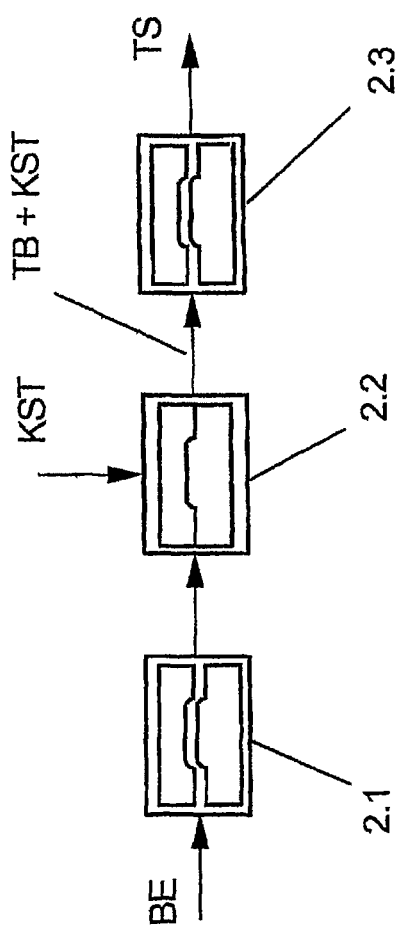
FIG. 2 shows a schematic block diagram of the combination of a forming process with the injection molding of reinforcements to the support structure base or the molding of additional elements.
Figure 3:
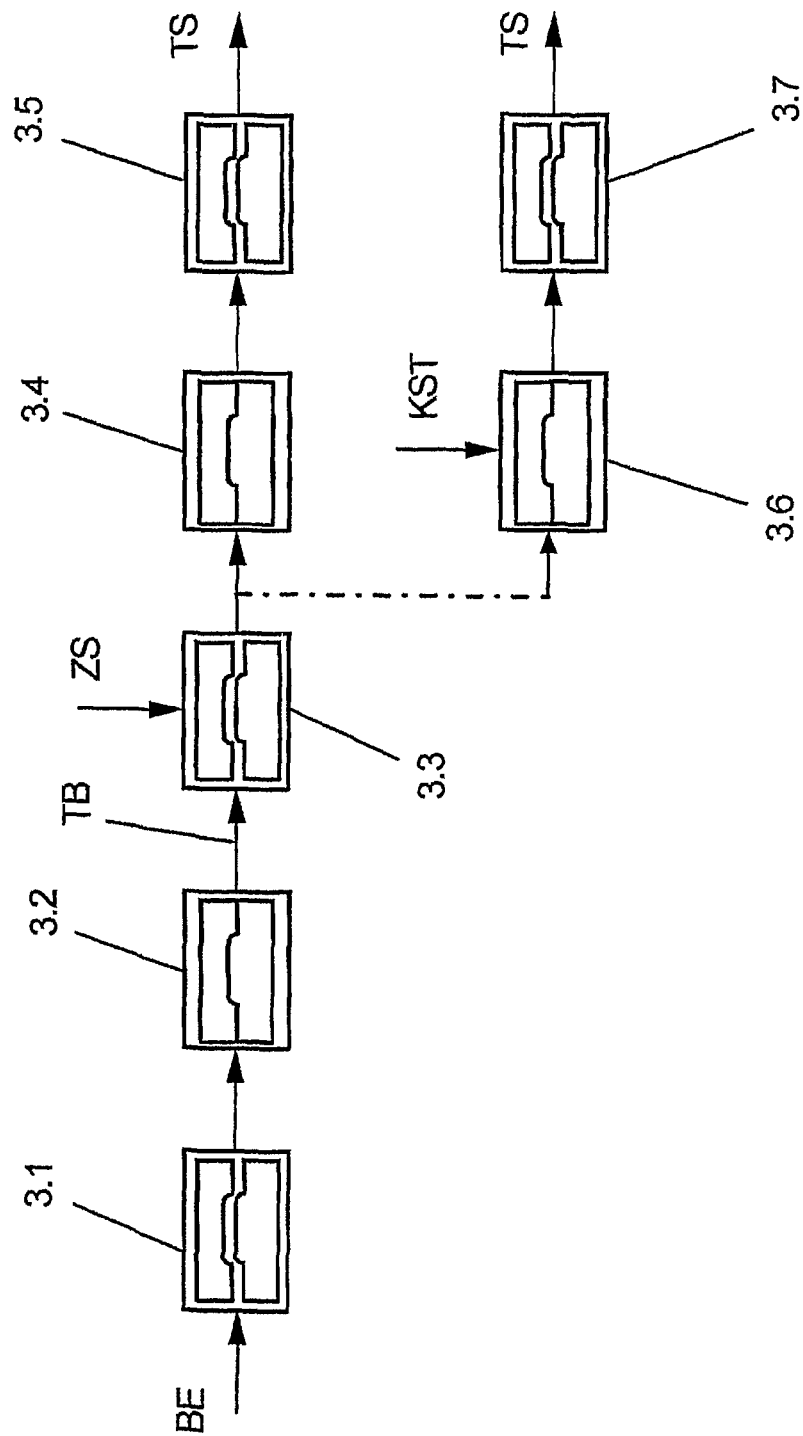
FIG. 3 shows a schematic block diagram of the combination of a forming process with the injection molding or molding of an additional structure to the support structure base.

FIGS. 1 to 3 schematically show a two-part mold whose parts can be moved together for the forming process and can be moved apart for removing the support structure or for inserting stiffening and reinforcing elements or additional structures. The methods of combining a forming process of a base element made of a fabric-reinforced thermoplastic material with an additional process for reinforcing the support structure base, integrally molding at least one additional structure and/or integrating functional parts or interfaces for additional components, which are schematically shown in FIGS. 1 to 3, should only be understood by way of example, since the above description reveals a multitude of variants of the method according to the invention of combining the forming process with an additional process in one and the same mold.

A fabric-reinforced thermoplastic material and in particular a glass fiber mat thermoplastic or GMT is a plastic material in which fabric or in particular glass fiber mats are bonded to each other and enveloped by a thermoplastic material. For this purpose, for example, two glass fiber mats which are mounted on two rollers in prefabricated form are passed onto a double belt. Between these laminate mats, a thermoplastic material or thermoplastic is injected by means of an extruder. Again, the mat obtained is enclosed by a thermoplastic film on both sides. The double belt at the same time acts as a so-called double-belt press in which first a heating unit (heat laminating zone) and then a cooling unit is mounted. At the end of the belt the finished plate material will then exit, which can be further processed as semi-finished product—as will be described below.

In a method step 1.1, the schematic block diagram represented in FIG. 1 shows the insertion of a prefabricated blank of a (cold) base element BE of fabric-reinforced thermoplastic material, for example a large-surface plate, into the mold, which possibly has first been heated in a multi-zone/infrared heating furnace or, to achieve a better temperature distribution in the base element BE, in an air-circulating oven. Tempered to about 40° C., the base element then is inserted into the mold arranged in a press manually or by robot, for which purpose the parts of the mold are moved apart. After moving the parts of the mold together, the forming process of the base element BE takes place in method step 1.2, in that the press then presses the base element BE into the desired shape.

In method step 1.3, the parts of the mold then are moved apart and a stiffening or reinforcing element VV or a plurality of stiffening and reinforcing elements VV is/are inserted into the support structure base TB formed of the molded base element BE and after moving the parts of the mold together injection-molded to the support structure base TB by injecting plastic material KST in method step 1.4. After moving the parts of the mold apart in method step 1.5, the support structure TS with the integrally molded reinforcing and stiffening elements VV can be removed.

FIG. 2 shows an alternative method in which after moving the parts of the mold apart, a base element BE of fabric-reinforced thermoplastic material likewise is inserted into the mold in method step 2.1 and after closing the mold the forming process is effected in method step 2.2, while simultaneously injecting plastic material KST for material accumulation and reinforcement of bearing points or other parts of the support structure exposed to pressure. In method step 2.3 the mold is moved apart and the support structure TS with the reinforcements at the support structure base TB is removed.

FIG. 3 shows a further alternative of the method according to the invention, in which in method step 3.1 a base element BE of fabric-reinforced thermoplastic material, in particular a glass fiber mat thermoplastic GMT is inserted into the parts of the mold moved apart, and in method step 3.2 the forming process of the base element is performed on closing the parts of the mold for manufacturing the support structure base, for example a seat pan. In method step 3.3 the mold is moved apart and an additional structure ZS, for example in the form of a spring mat, is inserted into the mold at the point of the support structure base TB provided for this purpose, for example at the seat pan formed as half-pan. On closing the mold in method step 3.4, the additional structure ZS is molded to the support structure base TB, and in method step 3.5 the finished support structure TS of support structure base TB and additional structure ZS is removed.

Alternatively, in method step 3.6 after method step 3.3 plastic material KST can be injected into the closed mold corresponding to the dash-dotted arrow and hence the additional structure ZS can be injection-molded to the support structure base TB, so that in method step 3.7 the support structure TS of support structure base TB and additional structure ZS can be removed after opening the mold.

In a further alternative, the additional structure ZS can already be inserted into the opened mold in method step 3.1 and be molded to the support structure base TB on forming the base element BE to obtain the support structure base TB.

Figure 4:
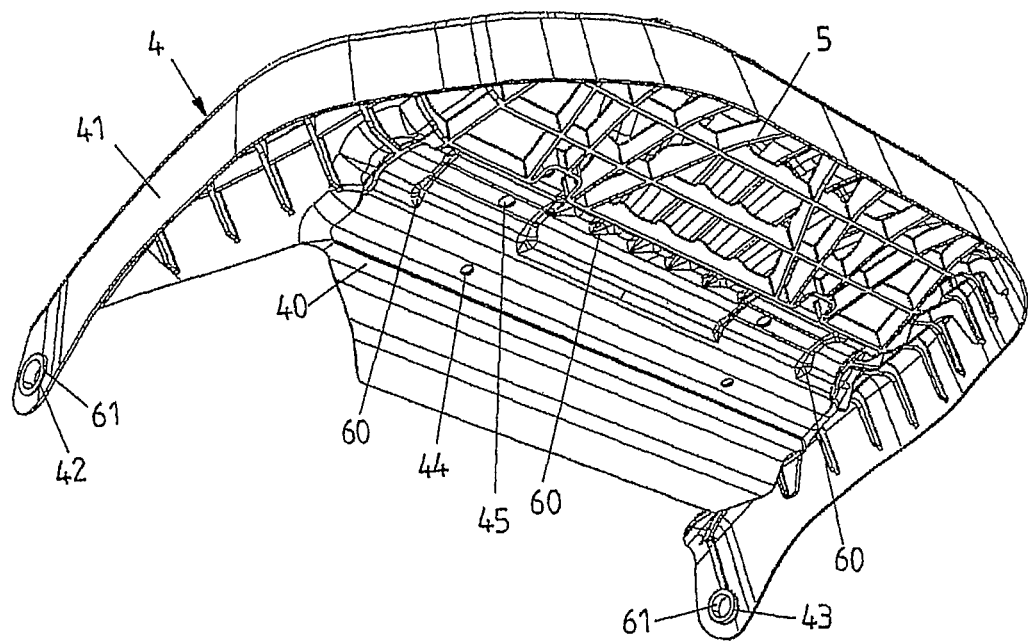
FIG. 4 shows a perspective bottom view of a seat pan formed as half-pan with a support structure base, bearing reinforcements and integrally molded stiffening and reinforcing elements.

As an application example for the method according to the invention, FIG. 4 shows a seat pan 4 formed as half-pan of a motor vehicle seat in a perspective bottom view.

The seat pan 4 contains a seating surface 40 and a seating surface edge 41, which were formed as support structure base from a base element of fabric-reinforced thermoplastic material and were brought into the shape shown in FIG. 4. After forming the seating surface 40 and the seating surface edge 41, a reinforcing and stiffening element 5 in the form of a grid-like stiffening rib structure is inserted into the bowl-shaped bottom side of the seating surface 40 and the seating surface edge 41 and injection-molded with plastic material 60 to the seating surface 40 and the seating surface edge 41, respectively. At the same time, plastic material 61 is injection-molded to bearing points 42, 43 at the ends of the seating surface edge 41 for reinforcing the bearing points 42, 43.

As can be taken from the representation shown in FIG. 4, openings 44, 45 are arranged in the seating surface 40, which were made in the seating surface 40 either during the forming process by a punch or after the forming process by boring or stamping 44, 45 and serve for accommodating fastening or adjusting elements.

Figure 5:
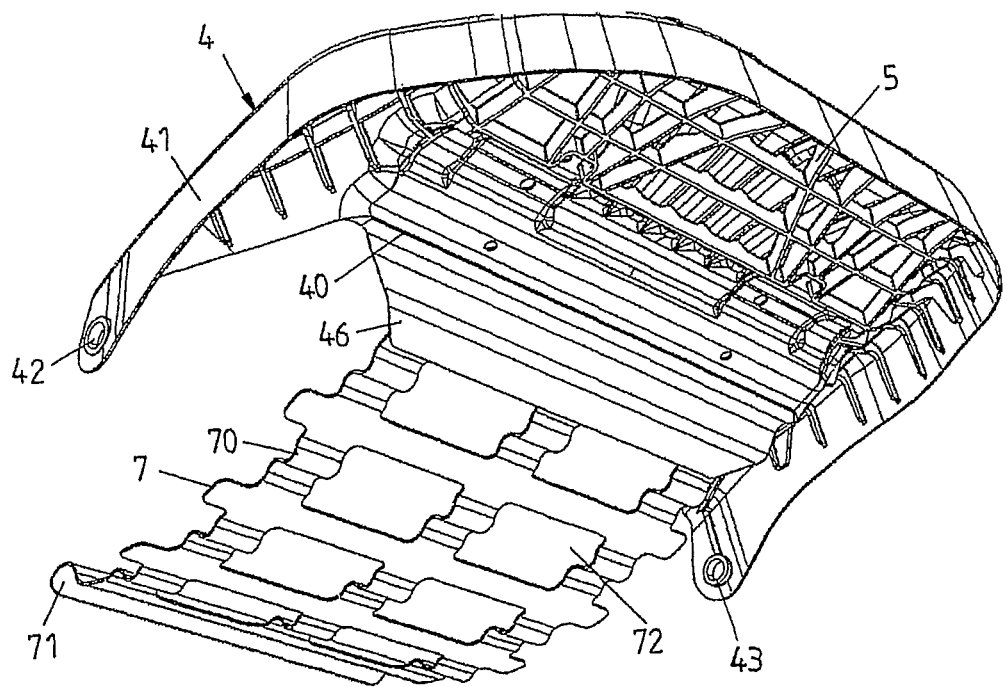
FIG. 5 shows a perspective bottom view of a seat pan formed as half-pan with integrally molded wavy spring mat.

FIG. 5 likewise shows a perspective bottom view of a seat pan 4 formed as half-pan with a seating surface 40 and a seating surface edge 41 as well as bearing points 42, 43 with integrated reinforcing and stiffening element 5. At the edge 46 of the seating surface 40 extending between the bearing points 42, 43, a spring mat 7 is integrally molded during or after the forming process for manufacturing the seat pan 4. The spring mat 7 formed in a wavy shape and likewise made of a fabric-reinforced thermoplastic material obtains its resilient properties by the formation of waves 70, wherein recesses 72 are provided for saving material and for improving the spring properties. At the end of the spring mat 7 opposite the edge 46 of the seating surface 40 a groove-like structure 71 is provided, with which the spring mat 7 is hung into a transverse tube of the motor vehicle seat for statically fixing the spring mat 7.

Further applications, in particular for the motor vehicle sector, can be derived from the application example for the seat pan of a motor vehicle seat as described above and from the manufacturing methods described with reference to FIGS. 1 to 3.

LIST OF REFERENCE NUMERALS 1.1-1.5 method steps of a first manufacturing method
2.1-2.3 method steps of a second manufacturing method
3.1-3.7 method steps of a third and fourth manufacturing method
4 seat pan
5 reinforcing and stiffening element
7 spring mat
8 mold
40 seating surface
41 seating surface edge
42, 43 bearing points
44, 45 openings
46 edge
60, 61 plastic material
70 waves
71 groove-like structure
72 recesses
BE base element
GMT glass fiber mat thermoplastic
KST plastic material
TB support structure base
TS support structure
VV stiffening or reinforcing element
ZS additional structure

The invention claimed is:

1. A method for manufacturing support structures in motor vehicles, in particular parts of a motor vehicle seat, the method comprising:
thermoplastically shaping at least one base element of a fabric-reinforced thermoplastic material in a mold to obtain a support structure base, wherein in at least one additional process at least one additional structure comprising reinforcing elements is integrally molded to the support structure base to obtain a seat pan,
wherein the seat pan is formed such that tensile stresses occurring in a region of the seat pan during usage are absorbed by the fabric-reinforced thermoplastic material, whereas compressive forces exerted on the seat pan during usage are absorbed by the reinforcing elements,
wherein a spring mat with a flat or wave-like cross-section is connected by only a single first edge to the seat pan by being integrally molded to the seat pan or, after thermoplastically forming the seat pan, connected to the seat pan by molding, wherein the spring mat comprises a second edge opposite the first edge at which a connecting structure for connecting the spring mat to a tube of a vehicle seat is formed,
wherein the spring mat, after the spring mat has been integrally molded to the seat pan or has been connected to the seat pan by molding, adjoins the seat pan with the first edge and spatially extends from the seat pan such that the spring mat with the second edge opposite the first edge is connectable to the tube of the vehicle seat.

2. The method according to claim 1, wherein in the at least one additional process, plastic material is injected into the mold or into a mold accommodating the thermoplastically formed support structure base.

3. The method according to claim 1, wherein the reinforcing elements are inserted into the thermoplastically formed support structure base and overmolded with plastic material.

4. The method according to claim 3, wherein the reinforcing elements are arranged in regions of the support structure base in which the support structure base is exposed to increased compressive stresses.

5. The method according to claim 1, wherein the at least one base element is made of a multi-layer fabric-reinforced thermoplastic material wherein a gas is introduced into spaces formed between layers of the multi-layer material for generating cavities or hollow chambers within the multi-layer material.

6. The method according to claim 1, wherein as the at least one base element a large-surface plate of a fabric-reinforced thermoplastic material, whose surface is larger than the projected surface of the workpiece holder of the mold, is inserted into the mold.

7. The method according to claim 1, wherein as the at least one base element a plurality of small-surface plates or strips of a fabric-reinforced thermoplastic material, whose surface is smaller than the projected surface of the workpiece holder of the mold, are inserted into the mold.

8. The method according to claim 7, wherein a shape and size of the small-surface plates or strips of the at least one base element are dimensioned corresponding to specific requirements of the support structure base.

9. The method according to claim 7, wherein the small-surface plates or strips are provided with various forms or types of fabric in the composition of the fabric-reinforced thermoplastic material.

10. The method according to claim 9, wherein in a region of the support structure base, which during intended use of the support structure is subjected to stress in a common stress direction, small-surface plates or strips of equal forms or types of fabric-reinforced thermoplastic material are used.

11. The method according to claim 1, wherein in the at least one additional process, plastic material is provided with short glass fibers or glass spheres in regions of increased compressive stresses acting on the support structure base.

12. The method according to claim 1, wherein the at least one additional structure is made of a fabric-reinforced thermoplastic material and is molded or injection-molded to the support structure base.

13. The method according to claim 12, wherein the at least one additional structure is molded to the support structure base when shaping the at least one base element.

14. The method according to claim 12, wherein the at least one additional structure is inserted into the mold and injection molded to the support structure base after shaping the base element.

15. The method according to claim 12, wherein the at least one additional structure is formed as a component made of metal or plastics and is injection-molded to the support structure base.

16. The method according to claim 1, wherein holders, bearing points or interfaces of the support structure base are molded to the support structure base when shaping the base element or are injection-molded to the support structure base after shaping the base element.

17. The method according to claim 1, wherein further fastening elements are injection-molded to the seat pan or to the spring mat.

18. The method according to claim 17, wherein the further fastening elements comprise at least one of hangings of the spring mat for fixing the spring mat on a transverse tube of a motor vehicle seat or bearing points of the seat pan.

* * * * *